Patented Mar. 26, 1946

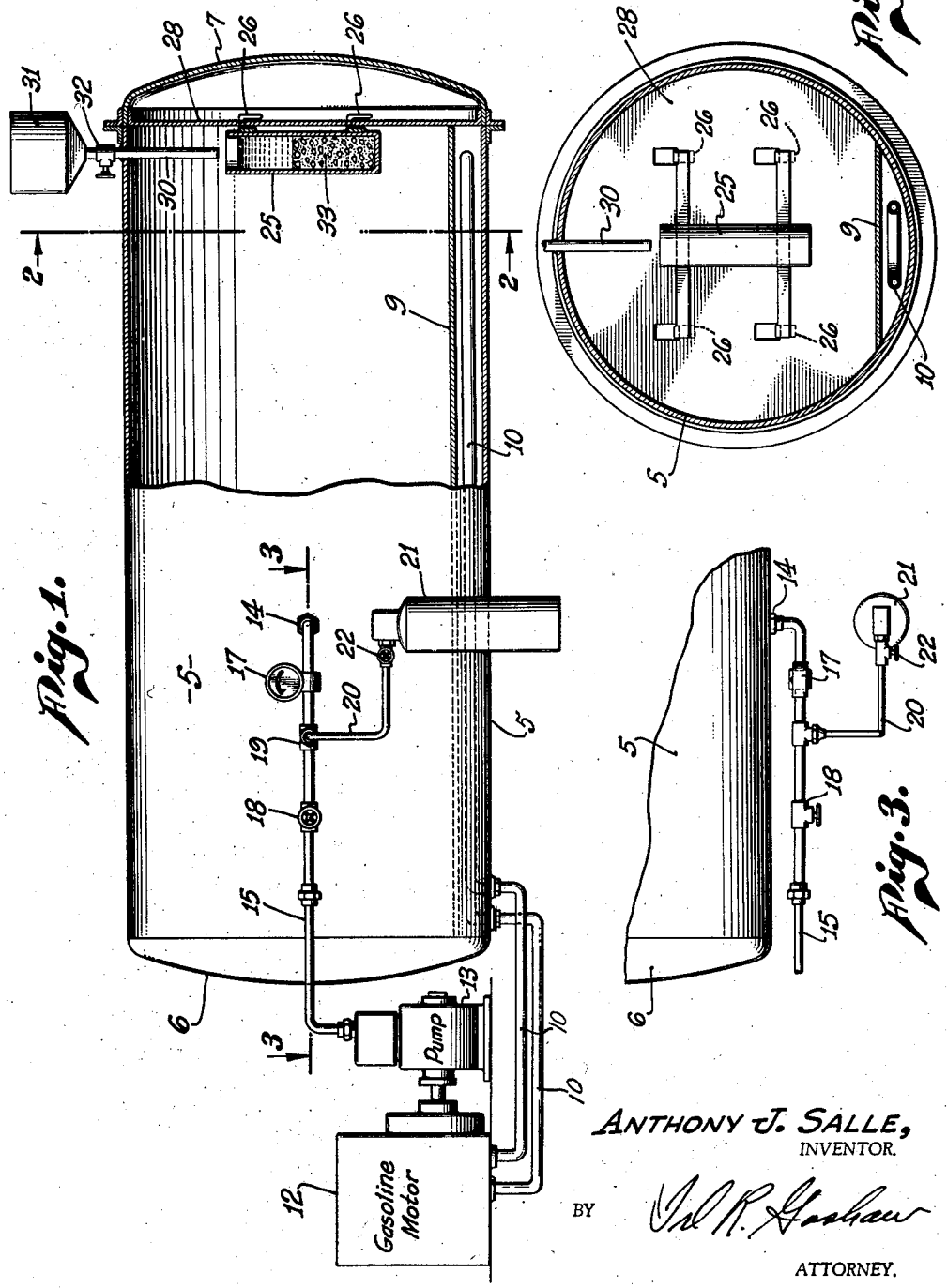

2,397,292

UNITED STATES PATENT OFFICE 2,397,292

STERILIZING METHOD AND SYSTEM

Anthony J. Salle, Los Angeles, Calif.

Application March 26, 1943, Serial No. 480,627

11 Claims. (Cl. 21—2)

This invention relates to sterilization methods and systems, and particularly to a method of and means for destroying the lower orders of plant life (yeasts, molds, bacteria, together with their spores) and the lower orders of animal life, insecta and arachnida. It is well known that certain gases such as formaldehyde (HCHO) are fumigating and sterilizing agents for bacteria, and the use of a 40% formaldehyde solution (formalin) with potassium permanganate in a vacuum chamber has been suggested by me for sterilizing household articles (see State of California Bureau of Furniture and Bedding Inspection Bulletin #3, of November, 1939, page 51).

The use of a vacuum chamber to aid impregnation and increase the efficiency of penetration of gases or liquids for sterilization is also well known in the art, as evidenced by U. S. Patent #2,134,924 of November 1, 1938. Other gases such as methyl bromide ($CH_3Br$) and methyl formate $$(HCOOCH_3)$$

have been used for destruction of members of the animal kingdom, such as insects. For the purpose of reducing sterilizing operations where both bacteria and insects are to be destroyed, materials have been exposed to a mixture of carbon disulphide and formaldehyde, with carbon dioxide present as a blanket gas to prevent explosion. All of these known processes have necessitated relatively long time periods to accomplish a complete kill.

The present invention is directed to a sterilization process where in the destruction of either insects or bacteria alone or the two simultaneously may be accomplished in shorter time periods than heretofore known, and with the optimum convenience. In this invention the two gases employed in the manner described hereinafter have been found to react in a way to provide a more efficient kill of certain organisms in both kingdoms than is possible with each gas functioning separately. The exact reaction between the gases, if any, or their combined reaction on the organisms, is still unknown, but data from a large number of tests have proved this increased efficiency.

The invention utilizes a vacuum chamber wherein formaldehyde gas is generated within the chamber. The sterilizing effect of gases is aided by heat, and it is a feature of this invention that, by generating the formaldehyde gas within the tank the heat evolved by the interaction of formalin and potassium permanganate is advantageously employed, as is but slightly the case when the generating is done outside the tank and the resulting gas introduced through a pipe. Methyl bromide is the other gas employed in the invention, the two gases, of the amounts specified below, having been found to function more efficiently in each other's presence, as evidenced by a complete kill of both bacteria and insects, or either, within shorter time periods than when each gas is used by itself. The reduction in time due solely to the simultaneous presence of the two gases is in the neighborhood of 25% of the usual time period required for a complete kill when only one gas is used to sterilize against its particular organism. Although other combinations of gases may provide complete kills, the combination of methyl bromide and formaldehyde has thus far been found to be the only practical combination from the standpoint of safety and efficiency.

The principal object of the invention, therefore, is to facilitate destruction of certain organisms of the plant or animal kingdoms.

Another object of the invention is to destroy certain organisms with greater efficiency.

A further object of the invention is to provide means for simultaneously sterilizing against bacteria and insects in shorter exposure time periods.

A further object of the invention is to provide a sterilization vacuum chamber of greater efficacy and convenience.

Although the novel features which are believed to be characteristic of this invention are pointed out with particularity in the claims appended herewith, the manner of its organization and the mode of its operation will be better understood by referring to the following description, read in conjunction with the accompanying drawing, in which:

Fig. 1 is an elevational view partially in cross-section of a vacuum tank embodying the invention;

Fig. 2 is a cross-sectional view of the tank of Fig. 1 taken along the line 2—2 thereof, and, Fig. 3 is a sectional plan view of Fig. 1, showing the control valves.

Referring now to Fig. 1, a cylindrical tank 5 has a fixed end member 6 and an end door member 7 which may be hinged and clamped in any suitable manner well known in the art. The tank has a floor 9 under which may be located conducting pipes 10 and 10' for heating the tank, as will be described hereinafter. A gasoline motor 12 or other suitable power source drives a vacuum pump 13 which is connected to the tank 5 at 14 by pipe 15. Positioned along the pipe 15 is a vacuum or pressure gauge 17, a shut-off valve 18 and a gas intake connection 19 which is connected by a pipe 20 to gas tank 21 having a valve 22.

Mounted on the flat inner wall 28 of the door 7 of the vacuum tank and adapted to be swung outwardly with the door, is a cylindrical or similarly-shaped type of container 25. The container 25 is detachably supported on wall 28 by means of a plurality of hooks 26 through holes in wall 28. Directly above the container 25 when the door 7 is in closed position is mounted a pipe 30, the upper end of which terminates in a tank 31 externally of the vacuum tank 5. A shut-off valve 32 controls the flow of fluid from the tank 31.

In operating the invention, the material to be sterilized is placed in chamber 5, formaldehyde is placed in the tank 31 and potassium permanganate is placed in the container 25 as shown at 33. For a tank of 500 cubic feet, the amount of these materials found to be satisfactory are three quarts of 40% formaldehyde solution to three pounds of potassium permanganate, while for a tank of one-half this capacity the amount of the material used is also one-half. In other words, for each cubic foot of vacuum chamber, 6 cc. of formaldehyde solution is used to 6 grams of potassium permanganate. The formalin gas is produced as follows:

The door 7 is closed with the potassium permanganate in the container 25 as shown at 33 and a vacuum of substantially 29 mercury inches is drawn, the valve 18, of course, being open during this period. As soon as a vacuum of 29 inches registers on the gauge 17, the valve 18 is closed and the valve 32 opened to let into the tank the proper amount of formaldehyde through the pipe 30. Assuming the tank has a capacity for 500 cubic feet, three quarts of formaldehyde solution will drop the vacuum approximately one mercury inch.

In past procedures and to insure a complete kill of bacteria, the material being sterilized was permitted to remain exposed to the formaldehyde gas in the tank for two hours. The present process, however, has shortened this period to one-half hour, while simultaneously sterilizing against insect pests. Although part of the reduction in the time interval required for a complete kill is, no doubt, due to the use of a higher vacuum than I have heretofore employed, this change in vacuum does not account for the entire reduction in time, since the formaldehyde alone will not result in a complete kill at the same high vacuum in the same period of time without the presence of methyl bromide.

The methyl bromide gas is introduced into tank 5 from tank 21. The proper amount of this gas is measured on gauge 17 by permitting methyl bromide to pass into the vacuum chamber until the vacuum has dropped substantially another inch on the gauge 17. Thus, the gauge now reads approximately 27 inches. The valve 22 is then closed and both gases permitted to remain in the tank for a period of one-half hour, which effects a complete kill for all organisms. After the one-half hour exposure, the valve 32, or other suitable valve, may be opened to allow air to enter the vacuum tank and the door 7 to be opened. If the tank is used in a closed room, it may be desirable to pump out the air mixture through an outside exhaust and let additional air into the tank before opening it.

This method of combining formaldehyde with methyl bromide is also advantageous from the safety standpoint. Methyl bromide is odorless and colorless, but when mixed with formaldehyde its presence can be easily detected.

As mentioned above, it has been found by tests that a period of one-half hour is sufficient to obtain complete sterilization because of some form of action of the combination or mixture of the gases upon the organisms. Thus, with both gases present, not only in sterilization with respect to both insects and micro-organisms obtained simultaneously, but the presence of each gas aids the action of the other.

It has been found that the generation of formaldehyde gas inside the tank in a detachable generating vessel, as described above, instead of generating it outside and introducing it into the vacuum tank, is a particularly desirable feature, as it provides maximum efficiency by retaining all the heat of generation developed inside the tank where it facilitates the treatment process. By the use of a detachable generating vessel on the door, greater convenience is obtained, since the permanganate, after volatilizing the formaldehyde, leaves a residuum that has to be cleaned out of the generating vessel from time to time. This is easily accomplished with the detachable vessel.

As mentioned above, the provision of heating pipes 10 and 10' aids sterilization in low temperatures. Hot water from the motor radiator or the exhaust gases from the motor may be circulated through pipes 10 and 10' to maintain such a temperature as will prevent the gases from condensing within the tank. When electric power is employed, the tank may be heated electrically.

I claim:

1. Sterilizing apparatus comprising a vacuum chamber, a detachable container on the door of said chamber, means in said container for generating gas, a container external of said chamber for holding a liquid, and means for introducing said liquid into said internal container to generate said gas.

2. Sterilizing apparatus comprising a vacuum chamber, a door for said chamber, a detachable container mounted on the inner side of said door, a tank mounted above said vacuum chamber, and means extending from said tank to the interior of said chamber for introducing liquid from said tank to said container.

3. Sterilizing apparatus in accordance with claim 2 in which means are provided for changing the temperature in the interior of said chamber.

4. The method of obtaining sterilization of various materials comprising placing said materials in a chamber, evacuating said chamber to a vacuum of substantially 29 mercury inches, subjecting said materials within said chamber to an amount of lethal gas sufficient to lower said vacuum substantially one mercury inch, then admitting into said chamber another lethal gas sufficient to lower said vacuum substantially another mercury inch, and maintaining said gases at said lowered vacuum for a predetermined time period.

5. The method of sterilizing various materials comprising placing said materials in a chamber, evacuating said chamber to a vacuum of substantially 29 mercury inches, generating sufficient formaldehyde gas within said chamber to lower said vacuum substantially one mercury inch, admitting sufficient methyl bromide gas within said chamber to lower the vacuum substantially another mercury inch, and maintaining said material exposed to said two gases at said lowered vacuum for a predetermined time period.

6. The method of sterilizing various materials comprising placing said materials within a chamber, evacuating said chamber to a high vacuum, applying formaldehyde gas to said materials within said chamber, applying methyl bromide gas to said materials within said chamber, and then maintaining said materials exposed to the combination of said gases over a predetermined time period.

7. The method in accordance with claim 6 in which the volume of said formaldehyde gas used reduces said vacuum substantially one mercury inch, and the volume of said methyl bromide gas used is determined by the reduction of said vacuum substantially another mercury inch.

8. The method in accordance with claim 6 in which said high vacuum is substantially 29 mercury inches and said predetermined time period is at least one-half an hour.

9. Sterilizing apparatus comprising a chamber, means for evacuating said chamber to a high degre of vacuum, a container within said chamber, a chemical in said container, a container to contact said chemical external of said chamber for holding a liquid, and means for introducing said liquid into said internal container to generate said gas.

10. Sterilizing apparatus comprising a chamber, means for evacuating said chamber to a high degree of vacuum, a container within said chamber for holding potassium permanganate, a container external of said chamber for holding formaldehyde solution, and means for introducing said formaldehyde solution into said internal container to contact said potassium permanganate to generate formaldehyde gas.

11. The method of sterilizing various materials comprising placing said materials in a chamber, evacuating said chamber to a high vacuum, subjecting said materials within said chamber to formaldehyde gas lethal to yeasts, molds, bacteria, and their spores, the volume of formaldehyde gas to which said materials are subjected being determined by the reduction of said vacuum a predetermined amount, subjecting said materials within said chamber to methyl bromide gas lethal to insecta and arachnida, the amount of said methyl bromide gas to which said materials are subjected being determined by the lowering of said vacuum another predetermined amount, and then maintaining said materials exposed to the combination of said gases for a predetermined time period, the combination of said gases producing a complete kill of said yeasts, molds, bacteria, insecta, and arachnida in a shorter time period than either of said gases acting alone.

ANTHONY J. SALLE.